(12) United States Patent  
Gilra

(10) Patent No.: US 12,437,411 B2
(45) Date of Patent: Oct. 7, 2025

(54) LOCALIZED SEAM CARVING AND EXPANSION WITH CONFIGURABLE LOCALIZATION THRESHOLD

(71) Applicant: Adobe Inc., San Jose, CA (US)

(72) Inventor: Anant Gilra, San Jose, CA (US)

(73) Assignee: Adobe Inc., San Jose, CA (US)

( * ) Notice: Subject to any disclaimer, the term of this patent is extended or adjusted under 35 U.S.C. 154(b) by 393 days.

(21) Appl. No.: 17/986,156

(22) Filed: Nov. 14, 2022

(65) Prior Publication Data

US 2024/0161302 A1   May 16, 2024

(51) Int. Cl.
*G06T 7/11* (2017.01)
*G06T 7/13* (2017.01)

(52) U.S. Cl.
CPC . *G06T 7/11* (2017.01); *G06T 7/13* (2017.01)

(58) Field of Classification Search
CPC .................................. G06T 7/11; G06T 7/13
See application file for complete search history.

(56) References Cited

U.S. PATENT DOCUMENTS

2013/0141530 A1* 6/2013 Zavesky ................ G06T 19/20
348/43

OTHER PUBLICATIONS

Sarkar et al, "Detection of Seam Carving and Localization of Seam Insertions in Digital Images", 2009. (Year: 2009).*
He et al, "A New Improved Seam Carving Content Aware Image Resizing Method", 2013. (Year: 2013).*
Lee et al, "Context-Aware Synthesis and Placement of Object Instances", 2018 (Year: 2018).*
Avidan et al., "Seam Carving for Content-Aware Image Resizing", ACM Transactions on Graphics, vol. 26, No. 3, Article 10, Jul. 2007, 10 pages.

* cited by examiner

*Primary Examiner* — Ruiping Li
(74) *Attorney, Agent, or Firm* — Nicholson De Vos Webster & Elliott LLP

(57) ABSTRACT

Embodiments are disclosed for performing localized seam carving, the image including multiple low activity regions. The method includes obtaining an image. A selection of a point of interest and a requested adjustment is received. A set of seams that are present in the low activity region are selected, with each seam including a connected path of pixels and each pixel having low activity. An adjusted set of seams is generated by duplicating or removing one or more seams from the set of seams using the adjustment. The set of seams in the low activity region is replaced by the adjusted set of seams. An updated image including the low activity region with the adjusted set of seams is output.

20 Claims, 8 Drawing Sheets

LOCALIZED SEAM CARVING AND EXPANSION WITH CONFIGURABLE LOCALIZATION THRESHOLD

BACKGROUND

In the field of editing images, seam carving provides a tool for resizing images using paths of pixels in the image. Seam-based adjustments are widely used to adjust edges of images such as cropping an edge to an object within an image. Performing seam carving near objects in an image has a wide range of quality challenges that can result in undesirable outputs of the seam carving such as images with artifacts or obscurations.

SUMMARY

Introduced here are techniques/technologies that relate to performing localized seam carving. To insert an object into an image, the system receives a selection of an image, a selection of an object, and a request to insert the object. A low energy portion of the image defines a region that has lower visual contrast relative to adjacent regions that include higher visual contrast portions of the image (e.g., a sparse region between two existing objects). The low energy portion of the image that defines a region has dimensions that are compared to a bounding box of the object to evaluate whether the object fits within the low energy portion of the image or whether the region should be expanded to accommodate the size of the bounding box. If the region should be expanded, a set of seams (e.g., a connected line of low-energy pixels) within the region are identified to perform an expansion of the region in the low energy portion. Some of the seams in the set of seams are duplicated and added to the region to expand the dimensions of the region until the size of the region is larger than the size of the bounding box. After the region has been expanded to a size larger than the bounding box, the system inserts the object into the image.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
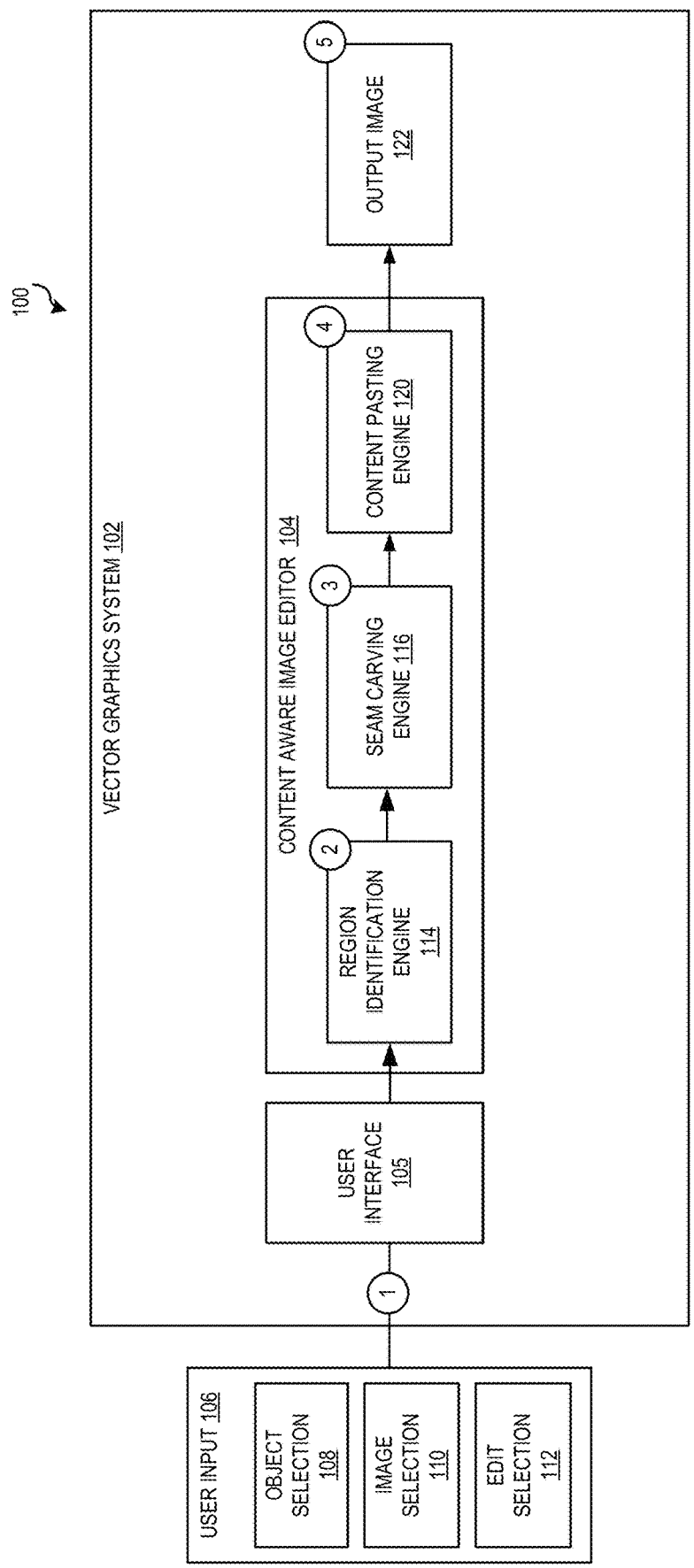
FIG. 1 illustrates a diagram of a process of localized seam carving and expansion with configurable localization threshold in accordance with one or more embodiments.

One or more embodiments of the present disclosure include a vector graphics system including a content aware image editor that inserts an object into an image using seam carving and expansion. Seam carving is a process of performing content-aware resizing of an image. A seam includes a line of low energy pixels that can be removed or duplicated to adjust the size of the image. A low energy pixel is a pixel that has low visual contrast when compared to adjacent pixels. Energy of a pixel is determined by measuring contrast between a particular pixel and each adjacent pixel. A low energy area includes pixels with relatively low contrast between adjacent pixels, while a high energy area includes pixels with high contrast relative to the adjacent pixels.

Existing approaches include seam carving the entire image for resizing or adjusting outer edges of the image. For instance, increasing a height or width of an image by duplicating or removing seams that are low energy and are near the edges of the image. The seams are automatically selected and used for resizing based on a comparison of the existing dimensions of the image and the desired dimensions of the image. However, this approach does not include seam carving between existing objects within the image because there is no process for controlling seam selection. As a result, this approach inserts an object into the image but may obscure existing objects in the image due to a lack of localization of the regions.

In another existing technique, a user can select a region between images for carving and object insertion. For example, each vertex of the region is selected manually by a user and the accuracy is limited by the skill of the user and the placement of each vertex. After the region is selected by the user, then seam carving can be performed on the region. However, this technique requires extensive understanding of region placement, and lacks flexibility to accommodate the size of the objects without high skill level and understanding which is not possessed by many graphic designers.

To address these and other deficiencies in conventional systems, embodiments perform localized seam carving by identifying seams that are positioned within localized regions of low energy adjacent to areas of high energy within the image. After the localized regions are identified, embodiments select one of the localized regions to expand by duplicating seams in the region to accommodate the size of an object to be inserted. The object and the duplicated seams are inserted into the region to provide an object insertion while preventing any obscuration of the existing objects in the image.

In an example, if a graphic designer wants to insert an object into an image at a position between two existing objects, using existing techniques, the graphic designer must move each object separately and edit the region in between the objects. Moving one object and then performing a manual fill of the gap between the original position and the new position of the object is nontrivial and often error prone. Also, matching the existing image colors and blending the region without distortion or error is exceedingly difficult for most graphic designers. As a result, artifacts and errors are left in the image that are undesirable.

In contrast, aspects of the present disclosure provide the ability to locally perform seam carving to insert an object within an image. The system identifies a region and uses the size of a bounding box (or bounded region) of an object to determine a number of seams to duplicate to increase the size of the region. The determined number of seams are duplicated, and the object and the duplicated seams are inserted into the image. Because the region is expanded by the duplicated seams, existing objects are not distorted or obscured. Thus, embodiments described herein provide an improvement in image editing and inserting objects into images by performing localized seam carving.

In addition, aspects of the present disclosure provide the ability to automate identification of slices for performing 3 or 9 slicing of the image. Slicing is a scaling technique that segments the image into a number (e.g., 3 or 9) of slices such that each slice can be adjusted individually. While 3 or 9 slicing can be performed, alternatively, more or fewer slices may be applied to an image consistent with the techniques described herein. In contrast with existing techniques that often are not intuitive and produce undesirable results, embodiments automate selection of the slices using the regions identified which produces a scaling operation that adjusts low energy regions and high energy regions differently to generate additional improvements in the output images.

FIG. 1 diagram of a process of localized seam carving and expansion with configurable localization threshold in accordance with one or more embodiments. As depicted in FIG. 1, a computing environment 100 includes a vector graphics system 102 that includes a content aware image editor 104 and a user interface 105. The content aware image editor 104 includes a region identification engine 114, seam carving engine 116, and content pasting engine 120. In some embodiments, the content aware image editor 104 is implemented as a module in a vector graphics system 102 or a computing application.

At numeral 1, the content aware image editor 104 obtains a user input 106 via user interface 105. The user input 106 includes an object selection 108, an image selection 110, and an edit selection 112. In an example, the object selection 108 identifies a vector object for adding to an image identified by the image selection 110. The object selection 108 is represented by a bounding box that defines the pixels corresponding to the vector object. The edit selection 112 indicates a type of edit, such as an addition or a removal of pixels from the image selection 110, and an indication of a location of the edit, and a representation of a threshold parameter. An example of the user input 106 includes a click/enter key to initiate the localized seam carving, a request for user input to select between a seam carving expansion or a seam carving contraction. In some embodiments, a user is presented with a slider to select amount of scaling/carving in a hybrid expansion and contraction such as removing seams in one direction and duplicating seams in another direction.

At numeral 2, the region identification engine 114 receives the user input 106. For instance, the user input 106 includes a localization threshold that is a pre-determined value of 50%. The localization threshold value represents a comparison between the energy in adjacent pixels that defines the boundary of the region. For example, a localization threshold value of 50% indicates that the difference between a pixel on the boundary of the region and an adjacent pixel outside of the region differs by a factor of 2. In some embodiments, the region identification engine 114 automatically selects the region using the localization threshold. In other embodiments, the region identification engine 114 identifies multiple regions and requests a selection of a region from a user.

In some embodiments, the region identification engine 114 assigns an index to various regions of the image, such as for generating a number of slices (e.g., 3 or 9) that can be used by the seam carving engine 116 to scale the image. Additionally, the region identification engine 114 can determine a type of content within the region and assign a metadata label such as text, object, background color, or a similar type of region.

In an example, the region identification engine 114 selects a low energy region based on shape of a region that includes a greater number of low energy areas such as by selecting a vertical region with more low energy areas instead of a horizontal region with a lower number of low energy areas. Aspect ratio of the bounding box is also used by the region identification engine 114. For instance, if the pasted object is thin and tall (e.g., 100 pixels wide by 300 pixels height), and two low energy regions are identified in the same localized area of the image, the region identification engine 114 selects a region that optimizes the seam carving operation. In this example, the region identification engine 114 identifies a first low energy region having a 50 pixel low energy vertical region and a second low energy region having 80 pixel low energy horizontal strip. The region identification engine 114 computes a duplication factor using the difference in size of the bounding box and each low energy region. The duplication factor in this example is a ration of the bounding box dimension with the pixel count of the region. The duplication factor for the first region is 2 because the bounding box is 100 pixels wide and the vertical region has 50 pixels. The duplication factor for the first region is 3.75 because the bounding box is 300 pixels wide and the horizontal region has 80 pixels. Using the duplication factor, the region identification engine 114 selects the vertical region as the lower duplication factor minimizes artifacts that could be created by seam duplication. In another example with a bounding box of a different size and the same identified regions, the selection may be different without changing the identified regions.

At numeral 3, the seam carving engine 116 receives the image with an identified region and the user input 106. For instance, seam carving engine 116 is configured to perform pre-processing of the image and retargeting of the image. Pre-processing of the image includes energy calculation for pixels in the image, dynamic programming on the energy of each of the pixels, finding the optimal seam paths via backtracking, mapping the seams and carving or expansion. Retargeting includes removing or adding the low energy seams and retargeting can be done in real time. During pre-processing of the image, seam carving engine 116 generates a matrix that stores a seam number for each pixel in the image.

In some embodiments, to perform local carving, the seam carving engine 116 identifies seams that are located within the localized region identified as described above. The seam carving engine 116 determines an orientation of the seam carving using the boundaries of the region identified by the region identification engine 114. For example, if the boundaries of the region represent a vertical region (e.g., a vertical dimension that is larger than a horizontal dimension), the seam carving engine 116 identifies vertical seams within the region. In another example, if the boundaries of the region represent a horizontal region (e.g., a vertical dimension that is less than a horizontal dimension), the seam carving engine 116 identifies horizontal seams within the region. Within the region, the pixels in a horizontal seam will not fall in the same row of pixels but are neighboring pixels in another row. Similarly, the pixels in a vertical seam will not fall in the same column of pixels but are neighboring pixels in another column. Each seam that is identified within the region is assigned a number by the seam carving engine 116. In some embodiments, a lower seam number means the seam will be carved or expanded before a seam that has a higher seam number.

In some embodiments, user input 106 indicates that seam carving is to be conducted in a vertical direction to insert an object and expand the image in a horizontal direction. To perform the seam carving, a number of vertical seams are identified by region identification engine 114. The number of seams identified is denoted S with each seam number having an index ranked by the energy of the pixels in the seam. Within the region, for each row in the region, the region identification engine 114 identifies the minimum seam index in the region, a maximum seam index in the region, and average seam index in the region. For each row, a threshold energy that represents a difference in energy between adjacent pixels is compared to the energy for each pixel. The threshold is configurable based on a desired tolerance of obscuring an existing object in the image.

Additional details of seam carving are described below.

In some embodiments, the region may be larger than the bounding box. For example, the seam carving engine 116 is configured to reduce one or more dimensions of the region that exceeds a corresponding dimension (e.g., horizontal dimensions or vertical dimensions) of the bounding box. To remove a portion of the region, the dimension of the region is reduced to a size that is at least one seam greater than the size of the dimension of the bounding box.

In still other embodiments, the seam carving engine 116 can scale each dimension differently. For example, the region is reduced in a horizontal dimension and expanded in a vertical dimension to accommodate the object to be inserted into the image. The seam carving engine 116 can use the difference in corresponding dimensions (vertical or horizontal) of the bounding box and the region to scale the region to an optimized fit of the object being inserted into the region.

At numeral 4, the content pasting engine 120 inserts the object and the additional seams generated by the seam carving engine 116. For example, after the seams are identified for expansion, the content pasting engine 120 inserts the object and duplicated seams into the image. In some embodiments, the content pasting engine 120 adjusts the boundaries of the image such as by expanding a horizontal or vertical dimension to insert the object and additional seams.

At numeral 5, the vector graphics system 102 generates the output image 122. For instance, the vector graphics system 102 generates an output visualization that includes the object inserted into the output image 122. The output image 122 includes the object, the image, and any additional seams that are inserted by the seam carving engine. The output image 122 is output by the vector graphics system 102 such as to a presentation device or a client device.

Figure 2:
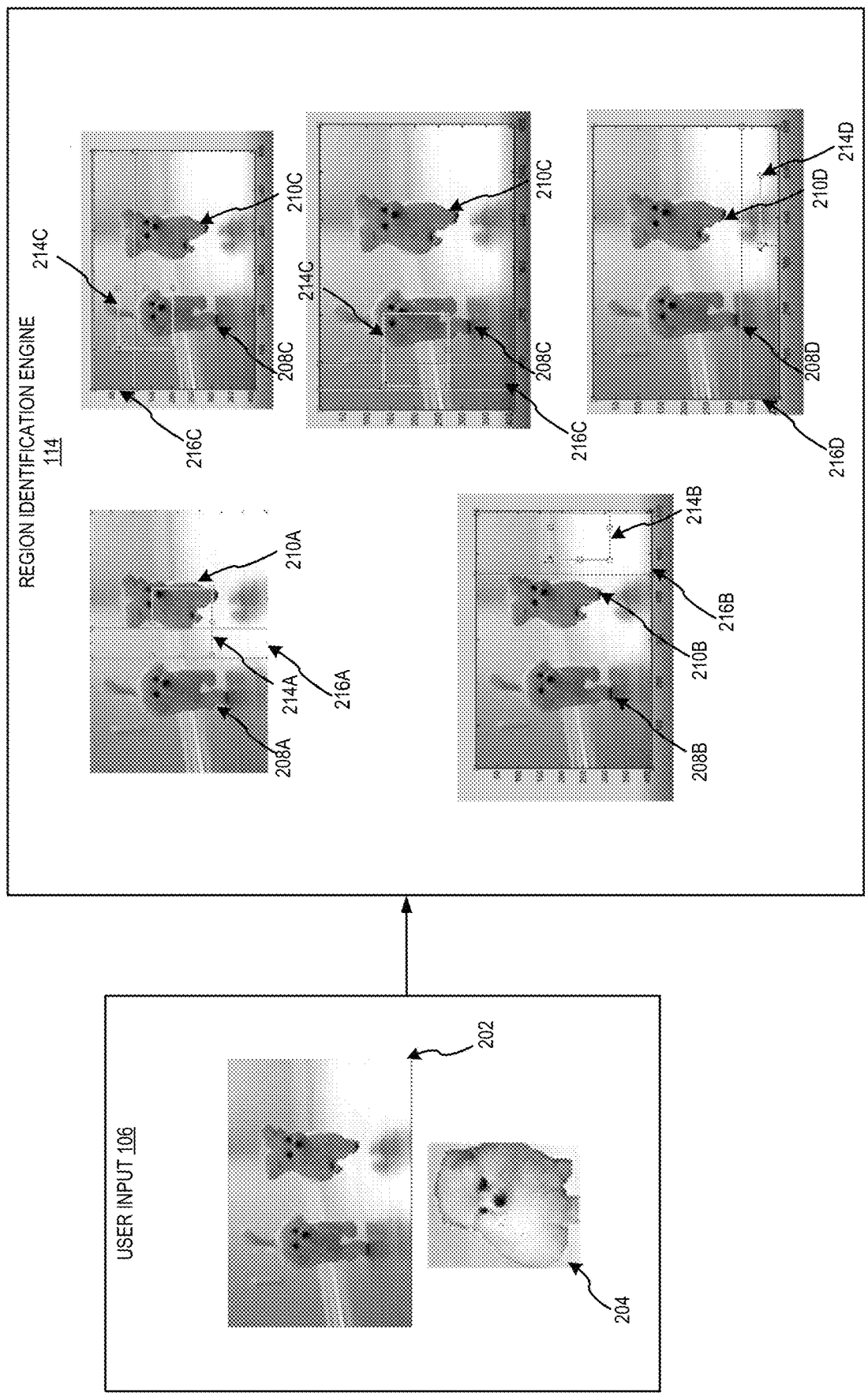
FIG. 2 illustrates an example of inserting an object into an image in accordance with one or more embodiments.

FIG. 2 illustrates an example of region identification in accordance with one or more embodiments. For instance, region identification engine 114 receives the image 202 and the object 204 for insertion into the image 202. In some embodiments, the region identification engine 114 identifies the region using a point of interest, such as a location of a cursor in response to a user input. The point of interest is received via a user input (e.g., a mouse movement) to a user interface. In other embodiments, a point of interest can be automatically selected by the region identification engine 114. As illustrated by FIG. 2, the region identification engine 114 presents regions 216A-216D. Each region is identified using a bounding box of object 204 by determining a low energy region relative to the adjacent regions that is a similar size to one or more dimensions of the bounding box. While FIG. 2 depicts square bounding boxes, any bounded region can be used.

In one example, region identification engine 114 identifies the region 216A using a bounding box 214A of the object 204. The region 216A is positioned between a first object 208A (e.g., a first dog) and a second object 210A (e.g., a second dog). Other regions 216B-216D are identified by detecting other regions of low energy relative to the first object 208B-D and the second object 210B-D, respectively. Region identification engine 114 can automatically select a region for inserting the object 204, such as by identifying a region that has a closest size to the bounding box 214A-D. In some embodiments, the region can be selected by the user in response to a presentation of regions 216A-216D.

Figure 3:
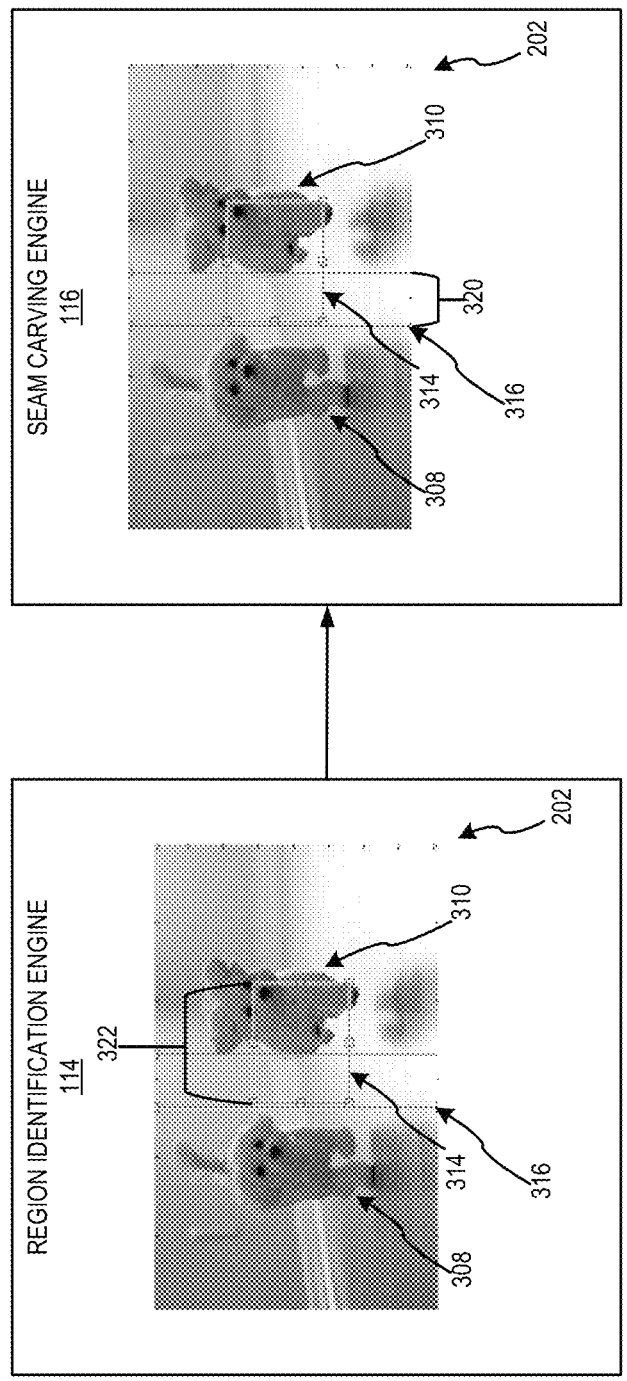
FIG. 3 depicts an example of identifying a local region for seam carving and expansion in accordance with one or more embodiments.

FIG. 3 illustrates an example of inserting an object into an image in accordance with one or more embodiments. For instance, the region identification engine 114 receives a user input 106 that identifies an image 202, an object selection that identifies an object, such as the object 204 in FIG. 2, and an edit selection that identifies an insert or deletion operation. In the example depicted by FIG. 3, the bounding box 314 represents the object selected for insertion into image 202. As described above with reference to the region identification engine 114, region 316 is identified which includes one or more seams of pixels. In the example depicted by FIG. 3, region 316 is a vertical region that identifies areas of low energy between the first dog 308 and a second dog 310 that include high energy regions. After identifying region 316, the seam carving engine 116 computes a position of a bounding box 314 that represents a boundary of the object to be inserted into the image. The region 316 is selected for seam carving expansion to expand the region 316 to insert the object represented by the bounding box 314.

To perform the expansion, the seam carving engine 116 computes a difference in the horizontal dimension of the bounding box 314 and the horizontal dimension 320 of the region 316. The difference represents a difference in pixels between the horizontal dimension 322 of the bounding box 314 and the horizontal dimension 320. Using the difference, the seam carving engine 116 duplicates a set of seams from the region 316 to expand the horizontal dimension 320 to a distance of at least the horizontal dimension of the bounding box 314. In order to perform duplication, the seam carving engine 116 selects a number of seams from the region for duplication. The seam carving engine 116 computes the number of seams to be duplicated by using the difference and a number of seams that are identified in the region 316.

In some embodiments, region 316 may be larger than the bounding box 314. In this example, the seam carving engine 116 is configured to remove a portion of the region 316 that exceeds one or more dimensions of the bounding box 314. To remove a portion of the region, the horizontal dimension 320 of the region 316 is reduced to a size that is at least one seam greater than the size of the horizontal dimension 322.

Figure 4:
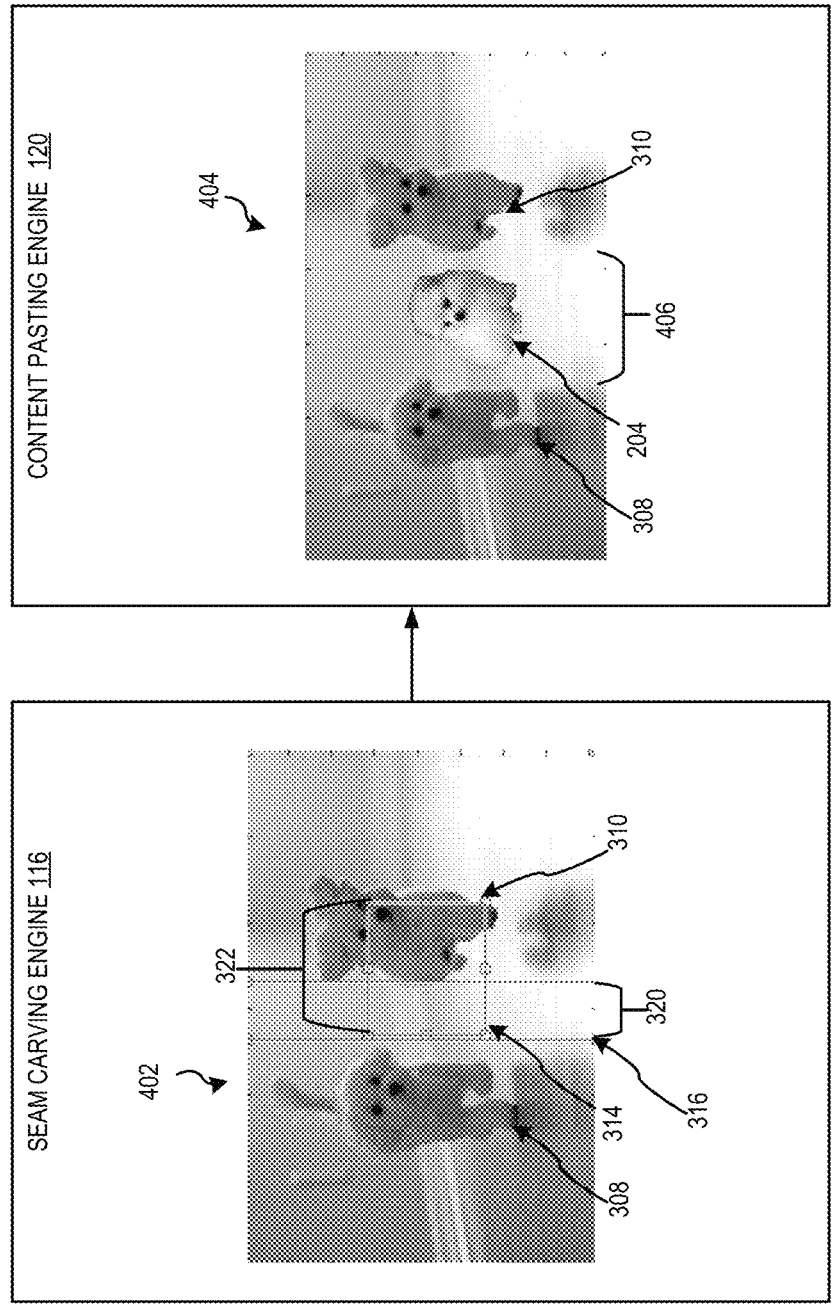
FIG. 4 illustrates performing an expansion of the local region using an object for insertion into the image in accordance with one or more embodiments.

FIG. 4 illustrates an example of inserting an object into an image in accordance with one or more embodiments. For example, as discussed above the seam carving engine 116 computes a number of pixels for expansions to insert the object using a comparison between the bounding box of the object and the dimension of the region. In some embodiments, an annotated image 402 is presented with the region 316 and the bounding box 314 identified using a series of lines. Using the difference between the horizontal dimension 320 of the region and the bounding box 314, the content pasting engine 120 inserts the object 204 and duplicates a number of seams from the region 316 to increase the dimensions of the region 316 to include the object 204. The updated horizontal dimension 406 includes the combination of the horizontal dimension 320 and the duplicated seams that are inserted such that the updated horizontal dimension 406 accommodates the horizontal dimension 322 of the bounding box 314.

Figure 5:
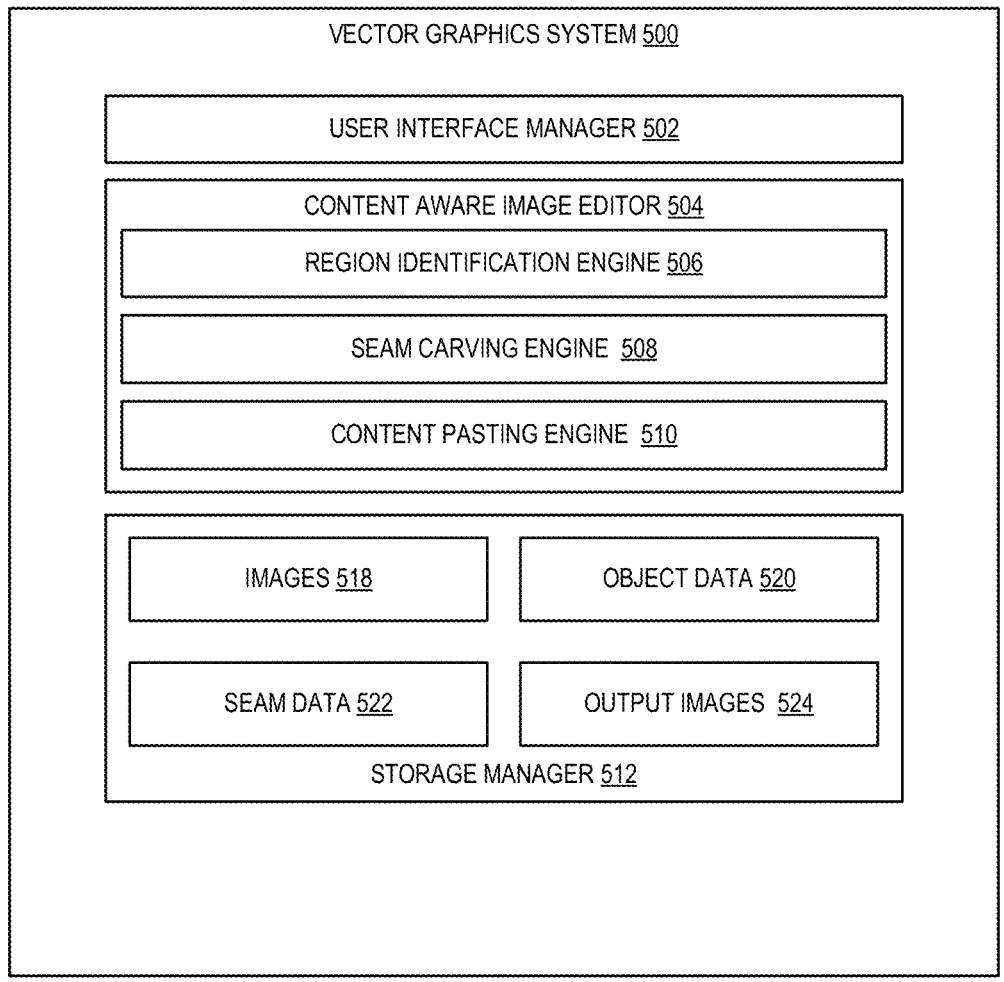
FIG. 5 illustrates a schematic diagram of a vector graphics system in accordance with one or more embodiments.

FIG. 5 illustrates a schematic diagram of a vector graphics system including a symmetric repeat edit generator in accordance with one or more embodiments. As shown, the vector graphics system 500 may include but is not limited to user interface manager 502, content aware image editor 504, and storage manager 512. The content aware image editor 504 includes region identification engine 506, seam carving engine 508, and content pasting engine 510. The storage manager 512 includes images 518, object data 520, seam data 522, and output images 524.

As illustrated in FIG. 5, the vector graphics system 500 includes a user interface manager 502. For example, the user interface manager 502 allows users to select images or objects for input to the vector graphics system 500. In some embodiments, the user interface manager 502 provides a user interface through which the user can upload the images 518 which include objects to be inserted into the image using seam carving and expansion, such as the object selection as discussed above. Alternatively, or additionally, the user interface manager 502 may enable the user to download the seam data 522, object data 520, or output image 524 from a local or remote storage location (e.g., by providing an address (e.g., a URL or other endpoint) associated with images 518). In some embodiments, the user interface manager 502 can enable a user to link a library of objects (e.g., object data 520) including multiple objects for insertion into images 518 by the vector graphics system (e.g., by content aware image editor 504).

Additionally, the user interface manager 502 allows users to request the vector graphics system 500 insert user selected object into images 518. For example, the users can select an image and an object for content aware insertion into the images 518. The user interface manager 502 allows the user to upload or select the object and the image to insert the object into. In some embodiments, the user interface manager 502 enables the user to view the resulting output images 524 and/or request edits to the image 518 such as repositioning the object within the image and updating the output image 524 with the new position of the object and adjusting the seams of the image 518.

As illustrated in FIG. 5, the content aware image editor 504 includes a region identification engine 506. The region identification engine 506 can receive an image 518, an object selection, and an edit selection from the user interface manager 502 to insert the object into the image 518. In some embodiments, the region identification engine 506 performs a search of the image 518 in proximity to a point of interest (e.g., a cursor position input by the user via user interface manager 502) for a region of low energy relative to other regions of greater energy. After identifying regions of low energy, the region identification engine, the content aware image editor 504 can present the identified regions to a user via a user interface for selection of a region.

As illustrated in FIG. 5, the content aware image editor 504 includes a seam carving engine 508. The seam carving engine 508 performs an energy calculation for pixels in the image, to identify a set of seams within the region for use during seam carving. The seam carving engine 508 identifies a direction of seam carving using an orientation of the region. The boundaries of the region indicate a vertical region when the region is defined by a vertical dimension that is greater than a horizontal dimension or a horizontal region when the region is defined by a vertical dimension that is less than a horizontal dimension. Each seam within the region is assigned a number by the seam carving engine 508. In some embodiments, the seams may be carved from lowest to highest number (e.g., seam 1 carved before seam 2). In other embodiments, the seam carving engine 508 is configured to select a number of seams across all of the numbers of seams. For example, when a region contains 10 seams, the seam carving engine 508 can select seams 1-5, or seams 1, 3, 5, 7, 9.

As illustrated in FIG. 5, the content aware image editor 504 includes a content pasting engine 510. The content pasting engine 510 inserts the object and the additional seams generated by the seam carving engine 508. For example, the content pasting engine 120 inserts the object and duplicated seams into the image to create an output image. In some embodiments, the content pasting engine 510 is configured to rasterize or otherwise render the image after insertion of the object and additional seams.

As illustrated in FIG. 5, the vector graphics system 500 also includes the storage manager 512. The storage manager 512 maintains data for the vector graphics system 500. The storage manager 512 can maintain data of any type, size, or kind as necessary to perform the functions of the vector graphics system 500. The storage manager 512, as shown in FIG. 5, includes the images 518. The images 518 can include a plurality of images that each include objects, as discussed in additional detail above.

As further illustrated in FIG. 5, the storage manager 512 also includes object data 520. Object data 520 can include information for any objects to be inserted into images 518 and utilized by the vector graphics system 500. For example, object data 520 includes coordinate matrices, perceptual parameters (e.g., hue, lightness, line thickness, etc.), and other information about objects to be inserted into images 518.

As further illustrated in FIG. 5, the storage manager 512 also includes seam data 522. The seam data 522 may include a representation of the seams identified within each of the images 518. As described above, the seams are identified by the seam carving engine 508 during a pre-processing or retargeting process. The seam data 522 can include a vector or matrix representation of the images 518 with the seam numbers assigned to each pixel in a particular seam.

As further illustrated in FIG. 5, the storage manager 512 also includes output images 524. The output images 524 includes images 518 that have objects inserted using localized seam carving as described above. The output images 524 include one or more of the objects from object data 520 and one of the images 518.

Each of the components 502-512 of the vector graphics system 500 and their corresponding elements (as shown in FIG. 5) may be in communication with one another using any suitable communication technologies. It will be recognized that although components 502-512 and their corresponding elements are shown to be separate in FIG. 5, any of components 502-512 and their corresponding elements may be combined into fewer components, such as into a single facility or module, divided into more components, or configured into different components that may serve a particular embodiment.

The components 502-512 and their corresponding elements can comprise software, hardware, or both. For example, the components 502-512 and their corresponding elements can comprise one or more instructions stored on a computer-readable storage medium and executable by processors of one or more computing devices. When executed by the one or more processors, the computer-executable instructions of the vector graphics system 500 can cause a client device and/or a server device to perform the methods described herein. Alternatively, the components 502-512 and their corresponding elements can comprise hardware, such as a special purpose processing device to perform a certain function or group of functions. Additionally, the components 502-512 and their corresponding elements can comprise a combination of computer-executable instructions and hardware.

Furthermore, the components 502-512 of the vector graphics system 500 may, for example, can be implemented as one or more stand-alone applications, as one or more modules of an application, as one or more plug-ins, as one or more library functions or functions that may be called by other applications, and/or as a cloud-computing model. Thus, the components 502-512 of the vector graphics system 500 may be implemented as a stand-alone application, such as a desktop or mobile application. Furthermore, the components 502-512 of the vector graphics system 500 may be implemented as one or more web-based applications hosted on a remote server. Alternatively, or additionally, the components of the vector graphics system 500 may be implemented in a suite of mobile device applications or "apps."

Figure 6:
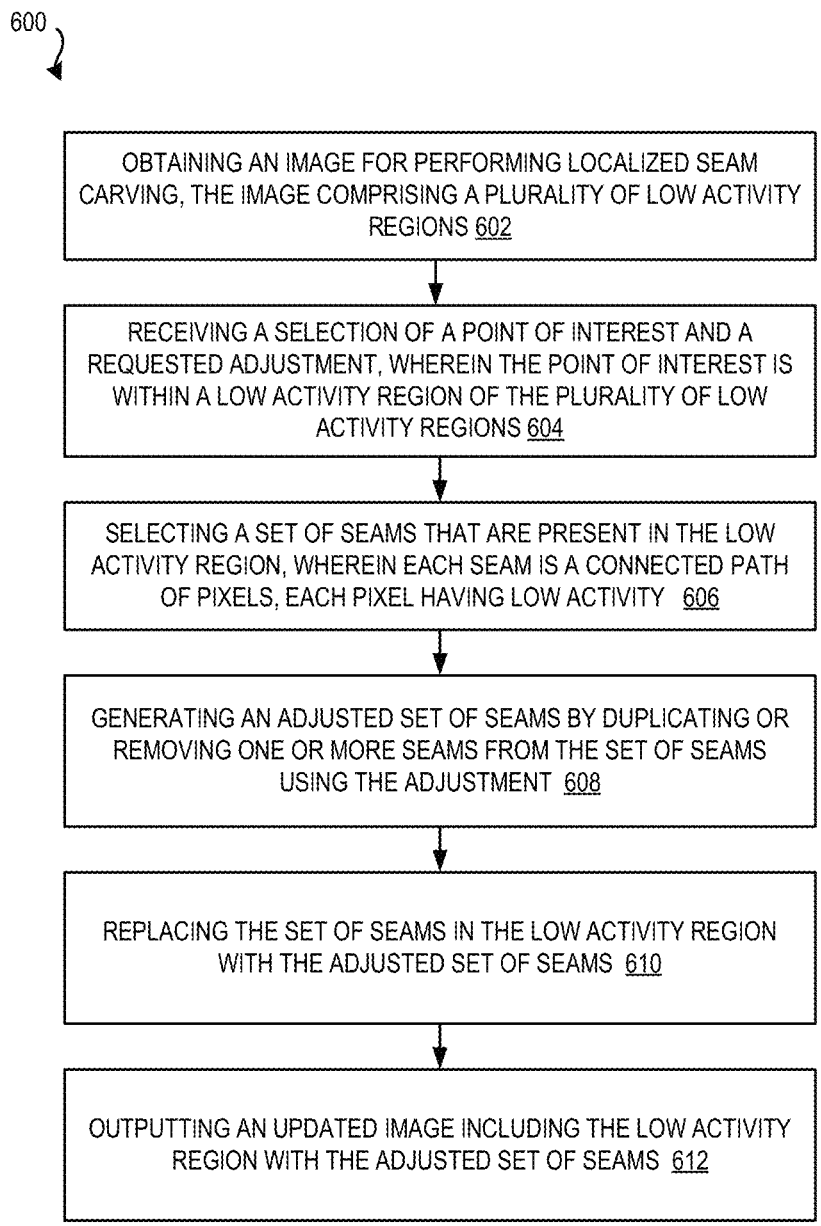
FIG. 6 illustrates a flowchart of a series of acts in a method of localized seam carving and expansion with configurable localization threshold in accordance with one or more embodiments.

FIGS. 1-5, the corresponding text, and the examples, provide a number of different systems and devices that allow a user to perform localized seam carving. In addition to the foregoing, embodiments can also be described in terms of flowcharts comprising acts and steps in a method for accomplishing a particular result. For example, FIG. 6 illustrates a flowchart of an exemplary method in accordance with one or more embodiments. The method described in relation to FIG. 6 may be performed with fewer or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart 600 of a series of acts in a method of perform symmetric repeat edits in accordance with one or more embodiments. In one or more embodiments, the method 600 is performed in a digital medium environment that includes the vector graphics system 500. The method 600 is intended to be illustrative of one or more methods in accordance with the present disclosure and is not intended to limit potential embodiments. Alternative embodiments can include additional, fewer, or different steps than those articulated in FIG. 6.

As illustrated in FIG. 6, the method 600 includes an act 602 of obtaining an image for performing localized seam carving, the image comprising a plurality of low activity regions. As described above, the content aware image editor obtains a user input including an object selection, an image selection, and an edit selection as part of a user input. The object selection indicates an object for insertion into the image identified by the image selection. In some embodiments, the low activity regions are identified from the image a localization threshold that represents a difference in energy between adjacent pixels.

As illustrated in FIG. 6, the method 600 includes an act 604 of receiving a selection of a point of interest and a requested adjustment, wherein the point of interest is within a low activity region of the plurality of low activity regions. As described above, the content aware image editor receives a point of interest by detecting a location of mouse movement within the image boundaries. The requested adjustment indicates a set of user configurable options, such as whether the region is to be expanded or shrunk to accommodate the object, and/or whether a region is to be selected automatically, or in response to a request for a user selection of multiple identified regions within the image.

As illustrated in FIG. 6, the method 600 includes an act 606 of selecting a set of seams that are present in the low activity region, wherein each seam is a connected path of pixels, each pixel having low activity. As described above, a number of horizontal or vertical seams of connected pixels are identified by the seam carving engine. Within the region, for each row in the region, the seam carving engine identifies a minimum seam number in the region, a maximum seam index in the region, and average seam index in the region. In some embodiments, the seam carving engine determines if a seam falls within the region based on a comparison between a number of pixels assigned to the seam that fall within the region and a number of pixels assigned to the seam that fall outside the boundary of the region. In some embodiments, the number of pixels falling within the boundary of the region can be compared to a threshold number of pixels within the region. By using these comparisons, the seam carving engine can include seams that are near the boundary of the region and include some pixels outside the region boundary. As a result, the accuracy of the region is improved because edge seams (e.g., seams near objects) are included.

As illustrated in FIG. 6, the method 600 includes an act 608 of generating an adjusted set of seams by duplicating or removing one or more seams from the set of seams using the adjustment. To generate the adjusted set of seams, the seam carving engine computes a difference between the bounding box of the object and the dimension of the region that is in the direction of carving (e.g., vertical or horizontal). The difference is a number of seams that will be added to expand the region to a dimension that accommodates the bounding box of the object. The seam carving engine performs the expansion by selecting a number of seams from the region for duplication. In some embodiments, the number of seams that are duplicated can be selected from a lowest seam number (e.g., a lowest energy seam) to a highest seam number (e.g., a highest energy seam) or as a sample between the maximum seam number and minimum seam number falling in the region.

As illustrated in FIG. 6, the method 600 includes an act 610 of replacing the set of seams in the low activity region with the adjusted set of seams. As described above, content pasting engine inserts the object and duplicated number of seams to increase the dimensions of the region to include the object. After the insertion of the object and the duplicated number of seams, the region includes an adjusted set of seams defined by the original seams of the region and a number of additional seams from the duplicated number of seams. In some embodiments, this replacement increases the dimension of the original image by the number of duplicated seams. For example, to insert an object into an image with a vertical region, the updated image (e.g., after insertion of the object) will include additional pixels in the horizontal direction when compared to the original image.

As illustrated in FIG. 6, the method 600 includes an act 612 of outputting an updated image including the low activity region with the adjusted set of seams. As described above, the content aware image editor outputs the updated image to a presentation device via a user interface or stores the updated image in a library of output images, such as described above regarding FIG. 5.

Figure 7:
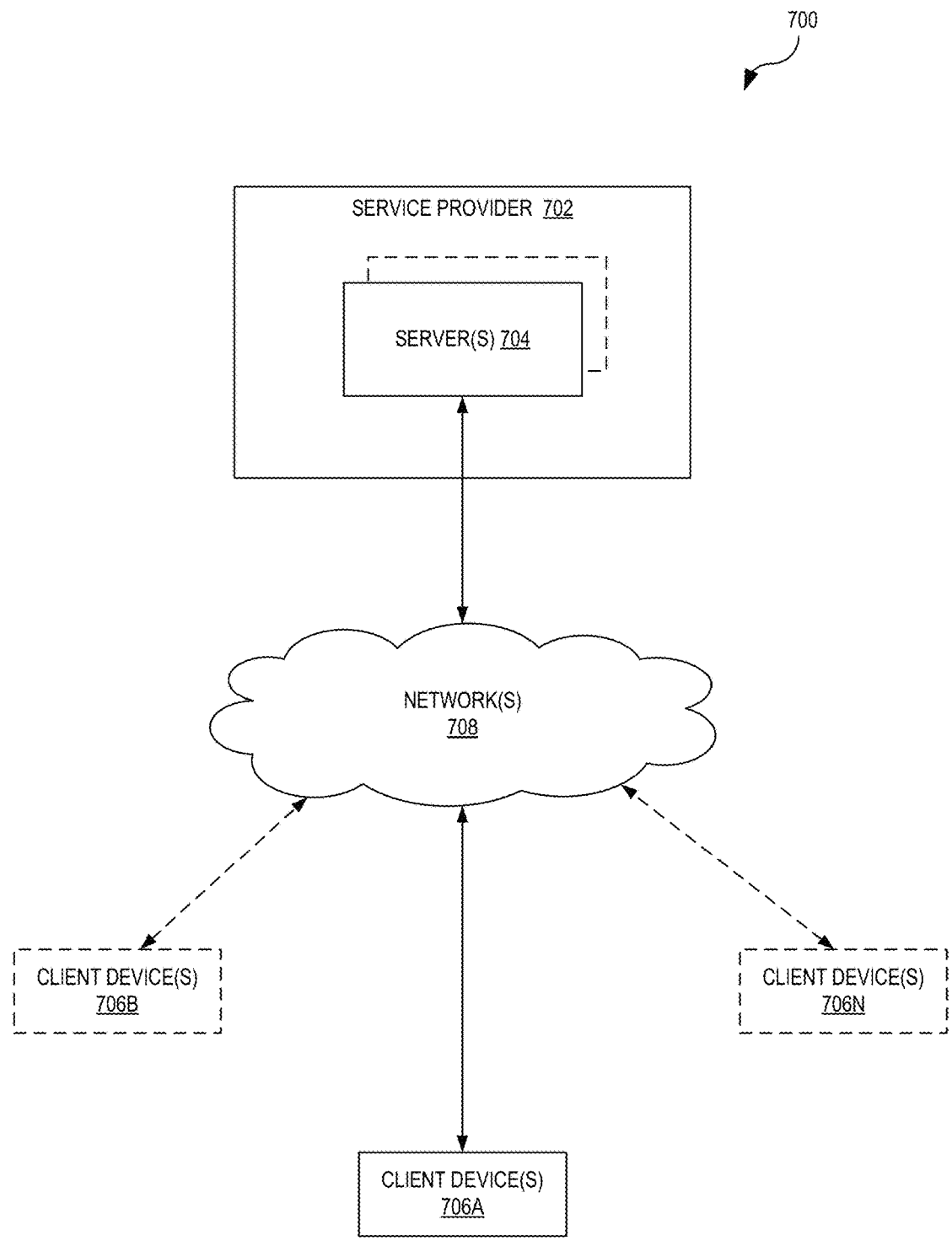
FIG. 7 illustrates a schematic diagram of an exemplary environment in which the vector graphics system can operate in accordance with one or more embodiments.

FIG. 7 illustrates a schematic diagram of an exemplary environment 700 in which the vector graphics system 500 can operate in accordance with one or more embodiments. In one or more embodiments, the environment 700 includes a service provider 702 which may include one or more servers 704 connected to a plurality of client devices 706A-706N via one or more networks 708. The client devices 706A-706N, the one or more networks 708, the service provider 702, and the one or more servers 704 may communicate with each other or other components using any communication platforms and technologies suitable for transporting data and/or communication signals, including any known communication technologies, devices, media, and protocols supportive of remote data communications, examples of which will be described in more detail below with respect to FIG. 8.

Although FIG. 7 illustrates a particular arrangement of the client devices 706A-706N, the one or more networks 708, the service provider 702, and the one or more servers 704, various additional arrangements are possible. For example, the client devices 706A-706N may directly communicate with the one or more servers 704, bypassing the network 708. Or alternatively, the client devices 706A-706N may directly communicate with each other. The service provider 702 may be a public cloud service provider which owns and operates their own infrastructure in one or more data centers and provides this infrastructure to customers and end users on demand to host applications on the one or more servers 704. The servers may include one or more hardware servers (e.g., hosts), each with its own computing resources (e.g., processors, memory, disk space, networking bandwidth, etc.) which may be securely divided between multiple customers, each of which may host their own applications on the one or more servers 704. In some embodiments, the service provider may be a private cloud provider which maintains cloud infrastructure for a single organization. The one or more servers 704 may similarly include one or more hardware servers, each with its own computing resources, which are divided among applications hosted by the one or more servers for use by members of the organization or their customers.

Similarly, although the environment 700 of FIG. 7 is depicted as having various components, the environment 700 may have additional or alternative components. For example, the environment 700 can be implemented on a single computing device with the vector graphics system 500. In particular, the vector graphics system 500 may be implemented in whole or in part on the client device 706A.

As illustrated in FIG. 7, the environment 700 may include client devices 706A-706N. The client devices 706A-706N may comprise any computing device. For example, client devices 706A-706N may comprise one or more personal computers, laptop computers, mobile devices, mobile phones, tablets, special purpose computers, TVs, or other computing devices, including computing devices described below regarding FIG. 8. Although three client devices are shown in FIG. 7, it will be appreciated that client devices 706A-706N may comprise any number of client devices (greater or smaller than shown).

Moreover, as illustrated in FIG. 7, the client devices 706A-706N and the one or more servers 704 may communicate via one or more networks 708. The one or more networks 708 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 708 may be any suitable network over which the client devices 706A-706N may access service provider 702 and server 704, or vice versa. The one or more networks 708 will be discussed in more detail below regarding FIG. 8.

In addition, the environment 700 may also include one or more servers 704. The one or more servers 704 may generate, store, receive, and transmit any type of data, including images 518, object data 520, seam data 522, output images 524, or other information. For example, a server 704 may receive data from a client device, such as the client device 706A, and send the data to another client device, such as the client device 702B and/or 702N. The server 704 can also transmit electronic messages between one or more users of the environment 700. In one example embodiment, the server 704 is a data server. The server 704 can also comprise a communication server or a web-hosting server. Additional details regarding the server 704 will be discussed below with respect to FIG. 8.

As mentioned, in one or more embodiments, the one or more servers 704 can include or implement at least a portion of the vector graphics system 500. In particular, the vector graphics system 500 can comprise an application running on the one or more servers 704 or a portion of the vector graphics system 500 can be downloaded from the one or more servers 704. For example, the vector graphics system 500 can include a web hosting application that allows the client devices 706A-706N to interact with content hosted at the one or more servers 704. To illustrate, in one or more embodiments of the environment 700, one or more client devices 706A-706N can access a webpage supported by the one or more servers 704. In particular, the client device 706A can run a web application (e.g., a web browser) to allow a user to access, view, and/or interact with a webpage or website hosted at the one or more servers 704.

Upon the client device 706A accessing a webpage or other web application hosted at the one or more servers 704, in one or more embodiments, the one or more servers 704 can provide access to images, symmetric object data, or output symmetric object pairs (e.g., images 518, seam data 522, etc.) stored at the one or more servers 704. Moreover, the client device 706A can receive a request (i.e., via user input) to perform a symmetric repeat edit of a symmetric object pair and provide the request to the one or more servers 704. Upon receiving the request, the one or more servers 704 can automatically perform the methods and processes described above to generate the output symmetric object pairs. The one or more servers 704 can provide all or portions of the output object sequence, to the client device 706A for display to the user.

As just described, the vector graphics system 500 may be implemented in whole, or in part, by the individual elements 702-708 of the environment 700. It will be appreciated that although certain components of the vector graphics system 500 are described in the previous examples with regard to particular elements of the environment 700, various alternative implementations are possible. For instance, in one or more embodiments, the vector graphics system 500 is implemented on any of the client devices 706A-706N. Similarly, in one or more embodiments, the vector graphics system 500 may be implemented on the one or more servers 704. Moreover, different components and functions of the vector graphics system 500 may be implemented separately among client devices 706A-706N, the one or more servers 704, and the network 708.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, that both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
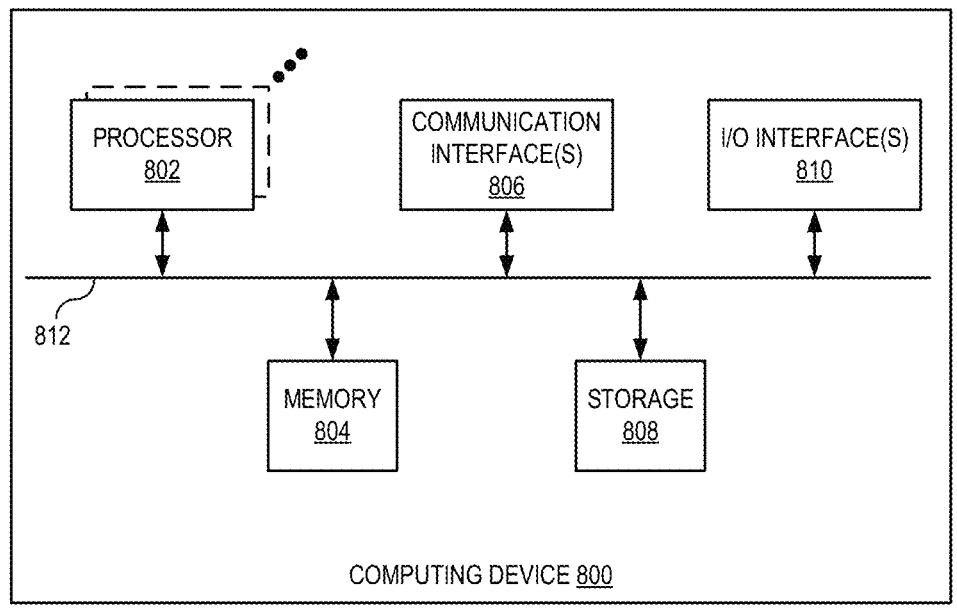
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the vector graphics system 500. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 which includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination of these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

I claim:

1. A method comprising:
    obtaining an image for performing localized seam carving, the image comprising a plurality of low activity regions;
    receiving a selection of a point of interest and a requested adjustment, wherein the point of interest is within a low activity region of the plurality of low activity regions, and wherein the adjustment includes a bounding box of an object to be inserted into the image in the low activity region;
    selecting a set of seams that are present in the low activity region, wherein each seam is a connected path of pixels, each pixel having low activity;
    computing a number of additional seams to be duplicated based on a comparison of the set of seams and a dimension of the bounding box;
    generating an adjusted set of seams by duplicating or removing one or more seams from the set of seams based on the comparison of the set of seams and a dimension of the bounding box;
    replacing the set of seams in the low activity region with the adjusted set of seams; and
    outputting an updated image including the low activity region with the adjusted set of seams.

2. The method of claim 1 further comprising:
    obtaining a selection of an object for insertion into the image; and
    inserting an object into the low activity region, wherein the inserting comprises:

generating the adjusted set of seams such that the low activity region with the adjusted set of seams includes a number of pixels greater than a number of pixels of the object.

3. The method of claim 1 further comprising identifying the low activity region from the plurality of low activity regions using the point of interest and a localization threshold.

4. The method of claim 1, wherein the adjustment includes a bounded region to be removed from the low activity region.

5. The method of claim 1, wherein computing a number of additional seams to be duplicated based on a comparison of the set of seams and a dimension of the bounding box further comprises:
   determining a difference between a number of seams in the set of seams and the dimension of the bounding box.

6. The method of claim 5, wherein generating an adjusted set of seams by duplicating or removing one or more seams from the set of seams based on the comparison of the set of seams and a dimension of the bounding box further comprises:
   duplicating the one or more seams from the set of seams until the adjusted set of seams is greater than the dimension of the bounding box.

7. The method of claim 6, wherein selecting a set of seams that are present in the low activity region, wherein each seam is a connected path of pixels, each pixel having low activity, comprises:
   identifying a set of pixels of a first seam, the set of pixels disposed within the low activity region, and wherein the set of pixels exceeds a threshold number of pixels;
   assigning the first seam to the set of seams;
   identifying an additional set of pixels of a second seam, wherein the second seam includes a first portion of the additional set of pixels disposed within the low activity region and a second portion of the additional set of pixels disposed outside of the low activity region; and
   assigning the first portion of the second seam to the set of seams.

8. A non-transitory computer-readable medium storing executable instructions, which when executed by a processing device, cause the processing device to perform operations comprising:
   obtaining an image for performing localized seam carving, the image comprising a plurality of low activity regions;
   receiving a selection of a point of interest and a requested adjustment, wherein the point of interest is within a low activity region of the plurality of low activity regions, and wherein the adjustment includes a bounding box of an object to be inserted into the image in the low activity region;
   selecting a set of seams that are present in the low activity region, wherein each seam is a connected path of pixels, each pixel having low activity;
   computing a number of additional seams to be duplicated based on a comparison of the set of seams and a dimension of the bounding box;
   generating an adjusted set of seams by duplicating or removing one or more seams from the set of seams based on the comparison of the set of seams and a dimension of the bounding box;
   replacing the set of seams in the low activity region with the adjusted set of seams; and
   outputting an updated image including the low activity region with the adjusted set of seams.

9. The non-transitory computer-readable medium of claim 8, the instructions further causing the processing device to perform operations comprising:
   obtaining a selection of an object for insertion into the image; and
   inserting an object into the low activity region, wherein the inserting comprises:
      generating the adjusted set of seams such that the low activity region with the adjusted set of seams includes a number of pixels greater than a number of pixels of the object.

10. The non-transitory computer-readable medium of claim 8, the instructions further causing the processing device to perform operations comprising identifying the low activity region from the plurality of low activity regions using the point of interest and a localization threshold.

11. The non-transitory computer-readable medium of claim 8, wherein the adjustment includes a bounded region to be removed from the low activity region.

12. The non-transitory computer-readable medium of claim 8, wherein computing a number of additional seams to be duplicated based on a comparison of the set of seams and a dimension of the bounding box further comprises:
   determining a difference between a number of seams in the set of seams and the dimension of the bounding box.

13. The non-transitory computer-readable medium of claim 12, wherein the instructions for generating an adjusted set of seams by duplicating or removing one or more seams from the set of seams based on the comparison of the set of seams and a dimension of the bounding box comprise instructions which, when executed by the processing device, further cause the processing device to perform operations comprising:
   duplicating the one or more seams from the set of seams until the adjusted set of seams is greater than the dimension of the bounding box.

14. The non-transitory computer-readable medium of claim 8, wherein the instructions for selecting a set of seams that are present in the low activity region, wherein each seam is a connected path of pixels, each pixel having low activity, comprise instructions which, when executed by the processing device, further cause the processing device to perform operations comprising:
   identifying a set of pixels of a first seam, the set of pixels disposed within the low activity region, and wherein the set of pixels exceeds a threshold number of pixels;
   assigning the first seam to the set of seams;
   identifying an additional set of pixels of a second seam, wherein the second seam includes a first portion of the additional set of pixels disposed within the low activity region and a second portion of the additional set of pixels disposed outside of the low activity region; and
   assigning the first portion of the second seam to the set of seams.

15. A system comprising:
   a memory component; and
   a processing device coupled to the memory component, the processing device to perform operations comprising:
      obtaining an image for performing localized seam carving, the image comprising a plurality of low activity regions;
      receiving a selection of a point of interest and a requested adjustment, wherein the point of interest is within a low activity region of the plurality of low activity regions, and wherein the adjustment includes a bounding box of an object to be inserted into the image in the low activity region;

selecting a set of seams that are present in the low activity region, wherein each seam is a connected path of pixels, each pixel having low activity;

computing a number of additional seams to be duplicated based on a comparison of the set of seams and a dimension of the bounding box;

generating an adjusted set of seams by duplicating or removing one or more seams from the set of seams based on the comparison of the set of seams and a dimension of the bounding box;

replacing the set of seams in the low activity region with the adjusted set of seams; and outputting an updated image including the low activity region with the adjusted set of seams.

16. The system of claim 15, the operations further comprising identifying the low activity region from the plurality of low activity regions using the point of interest and a localization threshold.

17. The system of claim 15, wherein the adjustment includes a bounded region to be removed from the low activity region.

18. The system of claim 15, wherein computing a number of additional seams to be duplicated based on a comparison of the set of seams and a dimension of the bounding box further comprises:

determining a difference between a number of seams in the set of seams and the dimension of the bounding box.

19. The system of claim 18, wherein the operations for generating an adjusted set of seams by duplicating or removing one or more seams from the set of seams based on the comparison of the set of seams and a dimension of the bounding box further comprise:

duplicating the one or more seams from the set of seams until the adjusted set of seams is greater than the dimension of the bounding box.

20. The system of claim 15, wherein the operations for selecting a set of seams that are present in the low activity region, wherein each seam is a connected path of pixels, each pixel having low activity further comprise:

identifying a set of pixels of a first seam, the set of pixels disposed within the low activity region, and wherein the set of pixels exceeds a threshold number of pixels;

assigning the first seam to the set of seams;

identifying an additional set of pixels of a second seam, wherein the second seam includes a first portion of the additional set of pixels disposed within the low activity region and a second portion of the additional set of pixels disposed outside of the low activity region; and assigning the first portion of the second seam to the set of seams.

* * * * *